(12) United States Patent
Williams et al.

(10) Patent No.: US 8,667,980 B2
(45) Date of Patent: Mar. 11, 2014

(54) NON-INTERRUPT METER CHANGE OUT

(75) Inventors: James Ola Williams, Marlborough, MA (US); Leo William Fleury, Jr., N. Smithfield, RI (US); Normand James Roy, Coventry, RI (US)

(73) Assignee: Mueller International, LLP, Atlanta, GA (US)

( * ) Notice: Subject to any disclaimer, the term of this patent is extended or adjusted under 35 U.S.C. 154(b) by 243 days.

(21) Appl. No.: 13/272,135

(22) Filed: Oct. 12, 2011

(65) Prior Publication Data

US 2012/0090697 A1 Apr. 19, 2012

Related U.S. Application Data

(60) Provisional application No. 61/393,212, filed on Oct. 14, 2010.

(51) Int. Cl.
*G01F 1/00* (2006.01)

(52) U.S. Cl.
USPC ............... 137/15.03; 137/315.06; 73/201

(58) Field of Classification Search
USPC ............... 137/15.03, 315.06; 73/201
See application file for complete search history.

(56) References Cited

U.S. PATENT DOCUMENTS

| | | | | |
|---|---|---|---|---|
| 1,969,432 | A * | 8/1934 | Smith et al. | 137/315.06 |
| 3,615,159 | A * | 10/1971 | Munoz | 285/18 |
| 3,946,754 | A * | 3/1976 | Cook | 137/315.06 |
| 5,785,086 | A * | 7/1998 | Boyce et al. | 137/625.38 |
| 7,886,761 | B2 | 2/2011 | Germata et al. | |
| 7,886,773 | B2 | 2/2011 | Mainzer | |
| 2008/0135106 | A1 * | 6/2008 | Germata et al. | 137/315.06 |

* cited by examiner

*Primary Examiner* — John Rivell
*Assistant Examiner* — Ian Paquette
(74) *Attorney, Agent, or Firm* — Taylor English Duma LLP (57) ABSTRACT

Disclosed is a non-interrupt meter change out device including a clamp assembly, at least one case assembly, and at least one collar, the clamp assembly including a frame and a distance adjuster.

5 Claims, 13 Drawing Sheets

NON-INTERRUPT METER CHANGE OUT

CROSS-REFERENCE TO RELATED APPLICATIONS

This application claims the benefit of U.S. Provisional Application 61/393,212 filed on Oct. 14, 2010, which is hereby incorporated herein in its entirety by reference.

FIELD

Embodiments of the present disclosure relate to devices, systems, and methods for changing out a meter that is in communication with a pipeline without interrupting the flow of fluid within the pipeline.

BACKGROUND

Meters are often attached to pipelines to measure the volume of fluid flowing past a point within the pipeline in both residential and commercial applications. The pipeline typically includes a meter bar with an inlet and outlet swivel fitting to facilitate connection of the meter to the pipeline.

Each swivel fitting includes a threaded nut and an annular flange. The threaded nuts engage complementary threads on the meter to secure the meter to the meter bar. A gasket (not shown) is disposed between the flange on the inlet/outlet swivel fittings and respective inlet/outlet ports of the meter to provide a fluid tight seal between the meter and the meter bar.

Many municipalities require gas meters to be changed periodically for preventive maintenance. In prior art systems, the flow of gas within the pipeline had to be shut off to allow changing of the meter. As a result, pilot lights downstream of the meter would be extinguished.

To relight the pilot lights, the municipalities would typically schedule appointments with customer to allow access to the home or business. Scheduling these types of visits introduces costly inefficiencies into the change out process.

Attempts have been made to provide a change out mechanism that does not interrupt the flow of fluid within the pipeline. In one attempt, a complex tool was designed to bypass the flow of fluid during meter change out. In this tool, the gasket retraction process is performed blindly inside the tool. This creates a problem because the elastomeric gasket that seals the meter to the swivel adheres to both the meter and swivel surfaces, which causes difficulty in separation and removal. Because the retraction process is performed blindly, it is difficult to ensure that the gasket will remain with the meter as it is removed. If the gasket is not retracted with the meter, the gas must be shutoff to allow the removal of the tool to gain access to the gasket for its subsequent removal.

Accordingly, there is a need in the industry for improved devices and methods for changing out meters in a pipeline without interrupting the flow of fluid within the pipeline.

BRIEF DESCRIPTION OF THE DRAWINGS

The features and components of the following figures are illustrated to emphasize the general principles of the present disclosure and are not necessarily drawn to scale. Corresponding features and components throughout the figures may be designated by matching reference characters for the sake of consistency and clarity.

DETAILED DESCRIPTION

The description below will now describe more fully hereinafter the features and embodiments of the current disclosure with reference to the accompanying drawings, in which some, but not all embodiments are shown. Indeed, the principles and advantages of the current disclosure may be embodied in many different forms and should not be construed as limited to the embodiments set forth herein; rather, these embodiments are provided so that this disclosure will satisfy applicable legal requirements. Like numbers refer to like elements throughout.

Various embodiments of the present disclosure provide an improved non-interrupt meter change out device ("NIMCO device") and method that solves various problems encountered in the prior art, some of which are noted above. Generally described, the NIMCO device includes a clamp that supports the weight of meter during change out, an inlet case assembly, and an outlet case assembly. The inlet and outlet case assemblies are disposed such that they enclose the joints between the meter inlet/outlet ports and the meter bar swivel fittings, respectfully. Slide valves within the case assemblies are activated to create a bypass for the fluid within the pipeline to facilitate removal of the meter without interrupting the flow of fluid within the pipeline. Also, innovative collars are employed to retain the gasket against the meter inlet/outlet ports during change out.

Figure 1:
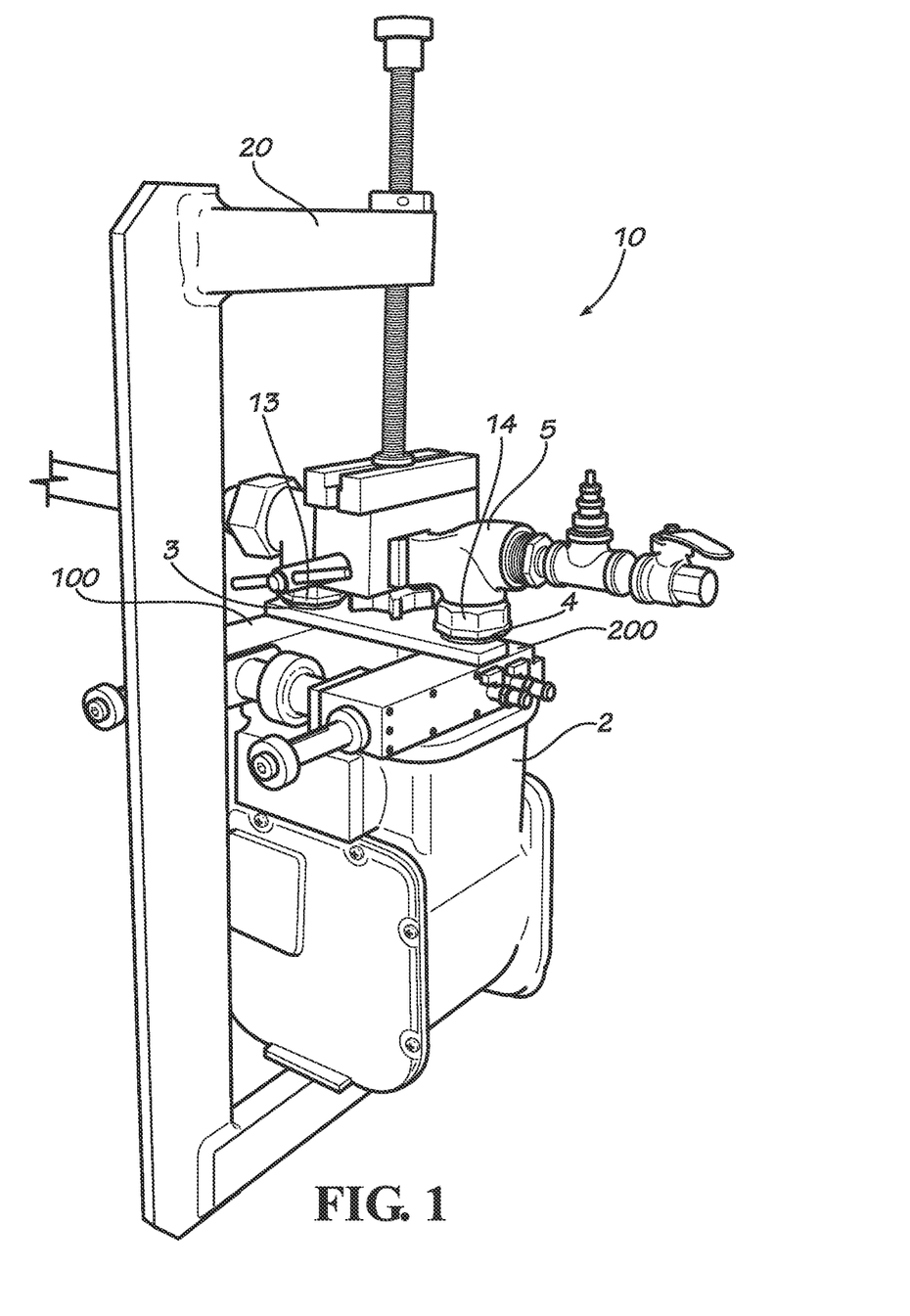
FIGS. 1-3 are perspective views of a NIMCO device attached to a meter and pipeline according to one embodiment of the present disclosure.
Figure 2:
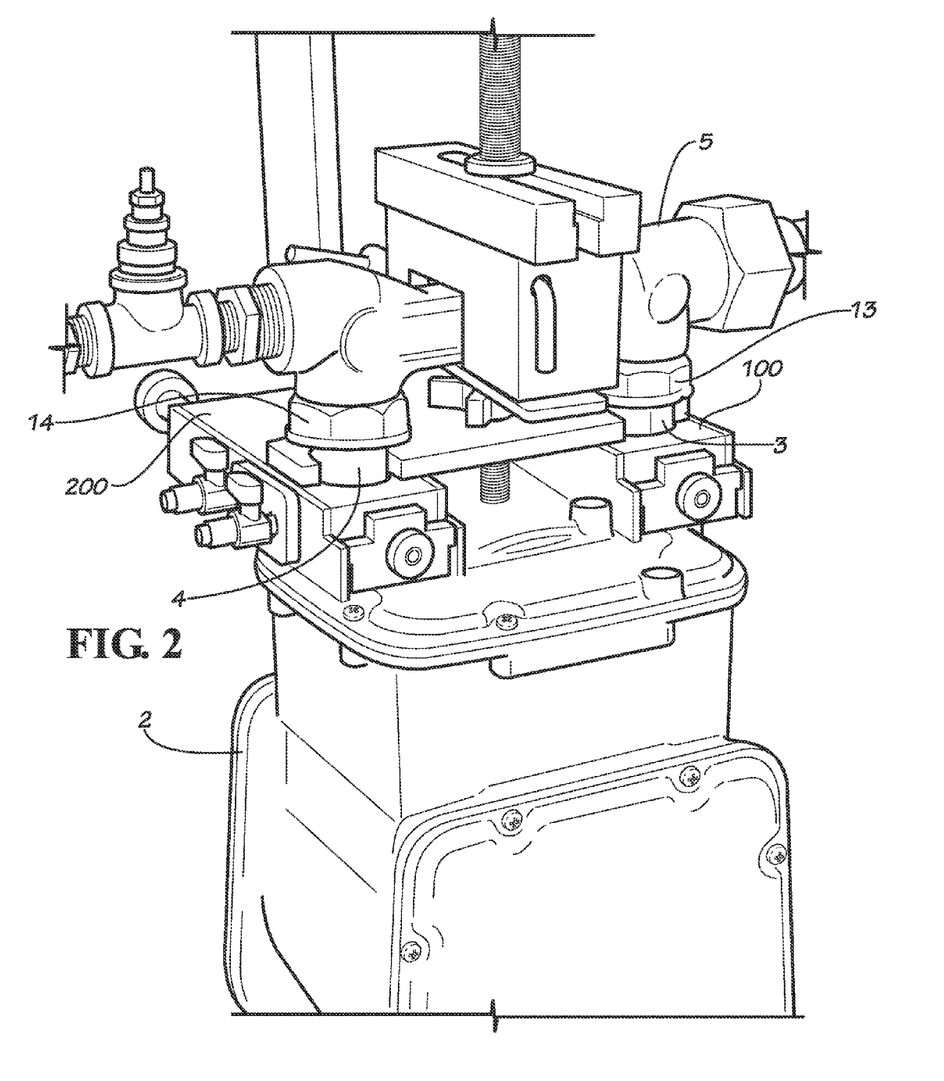
Figure 3:
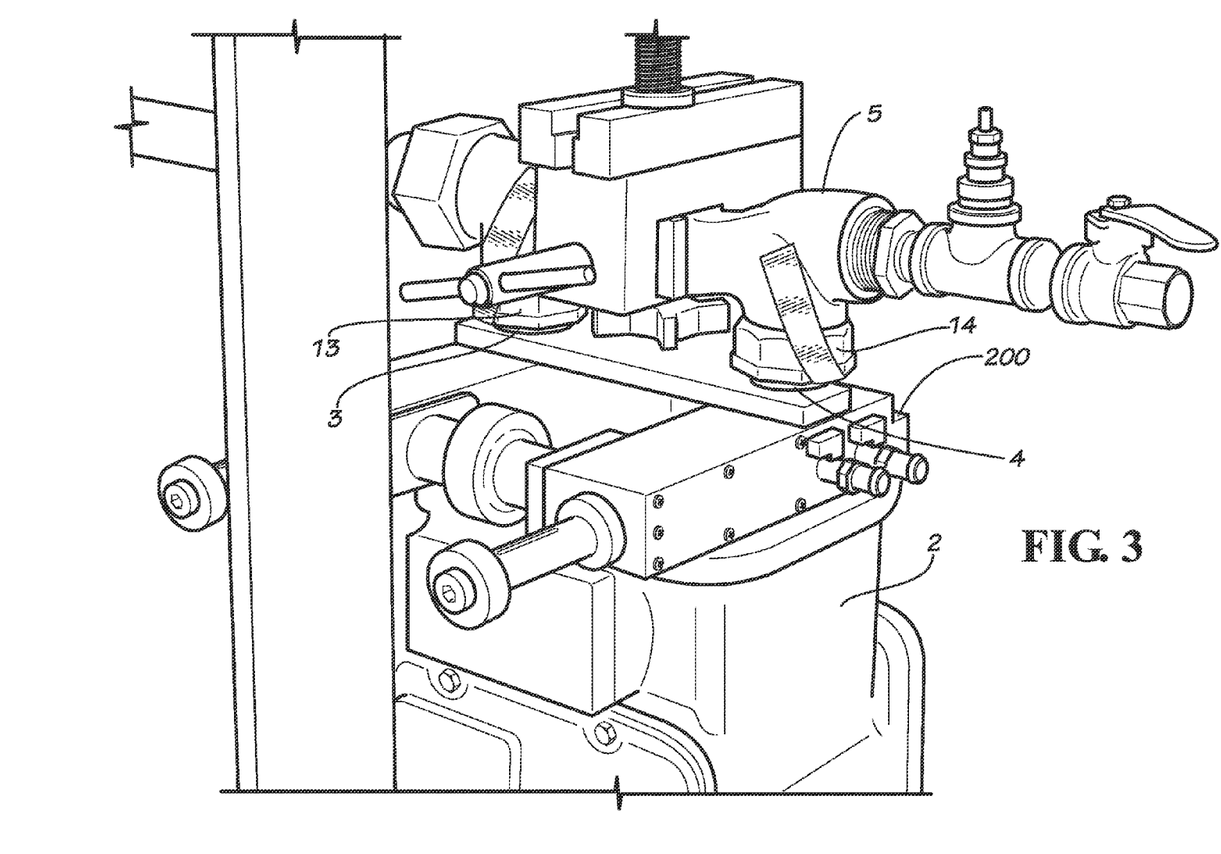

FIGS. 1-3 illustrate a NIMCO device 10 secured to a meter 2 and meter bar 5. The meter 2 is placed in fluid communication with a pipeline via the meter bar 5. As will be understood by those of ordinary skill in the art, an inlet port 3 and an outlet port 4 of the meter 2 are secured to an inlet swivel fitting 13 and outlet swivel fitting 14 of the meter bar 5, respectively. These connections provide fluid communication between the pipeline and the meter 2.

In the illustrated embodiment, the NIMCO device 10 includes a clamp assembly 20, an inlet case assembly 100, and an outlet case assembly 200. As illustrated, the clamp assembly 20 has a substantially "C" shaped structure with one portion engaging the meter bar 5 and a second portion engaging the bottom of the meter 2.

Also illustrated are the inlet and outlet case assemblies 100, 200. These assemblies are disposed around inlet and outlet joints between the meter 2 and the meter bar 5, specifically, at joints of the inlet port 3 with the inlet swivel fitting 13 and at the outlet port 4 with the outlet swivel fitting 14. When the meter 2 is lowered away from the meter bar 5, slide valves within the inlet and outlet case assemblies 100,200 are activated using respective handle assemblies 170 (shown in FIG. 9) to provide a bypass path for the fluid to follow while the meter 2 is being removed.

Figure 4:
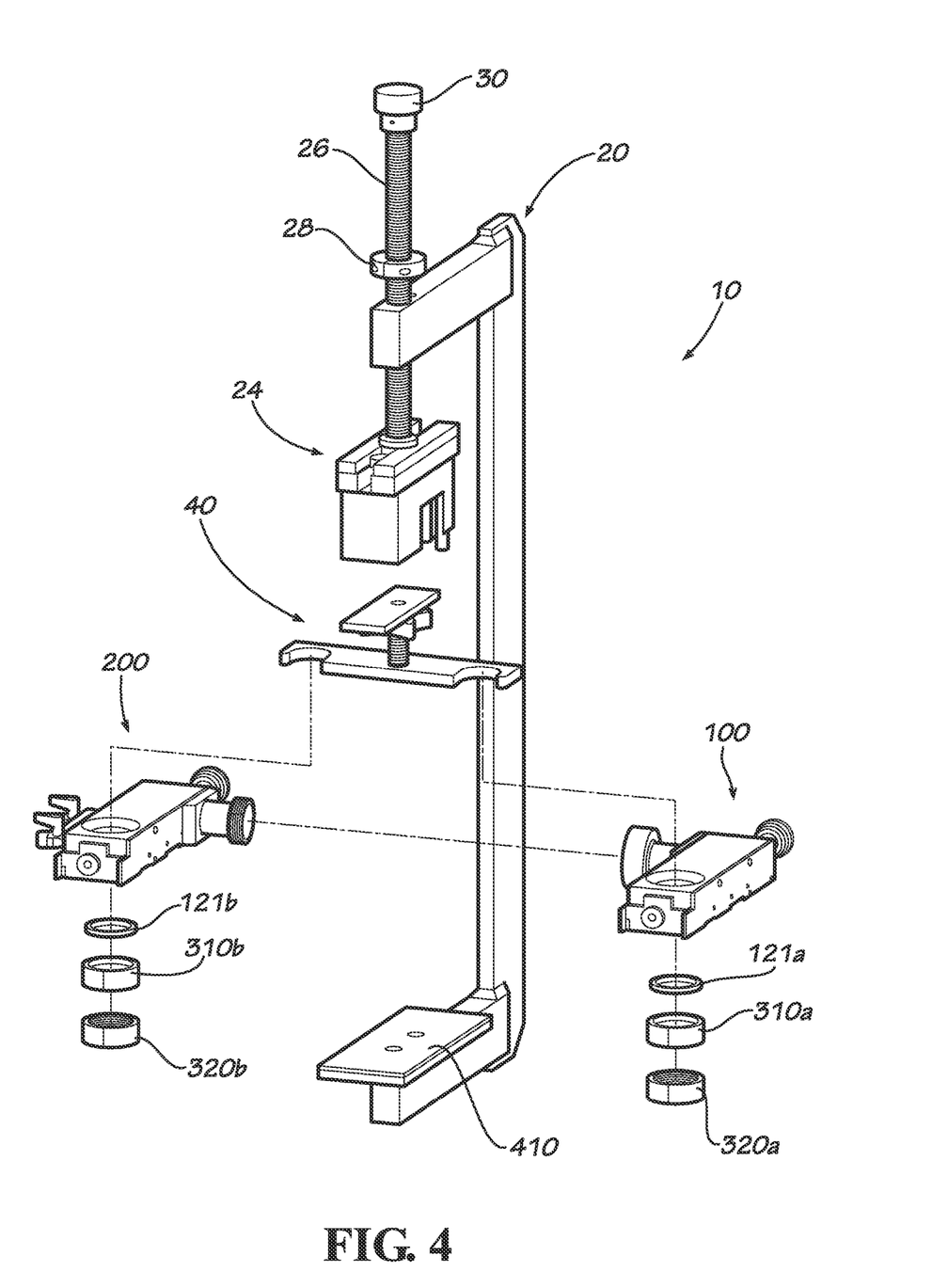
FIG. 4 is an exploded view of the NIMCO device of FIG. 1.

FIG. 4 is an exploded view of the NIMCO device 10 in accordance with an embodiment of the present disclosure. As illustrated, the NIMCO device 10 includes a clamp assembly 20, an inlet case assembly 100, an outlet case assembly 200, two seals 121*a,b*, two gasket installation collars 310*a,b*, and two gasket removal collars 320*a,b*. The seals 121*a,b* may be o-rings in various embodiments. Each of these components will now be described in greater detail.

I. Clamp Assembly

Figure 5:
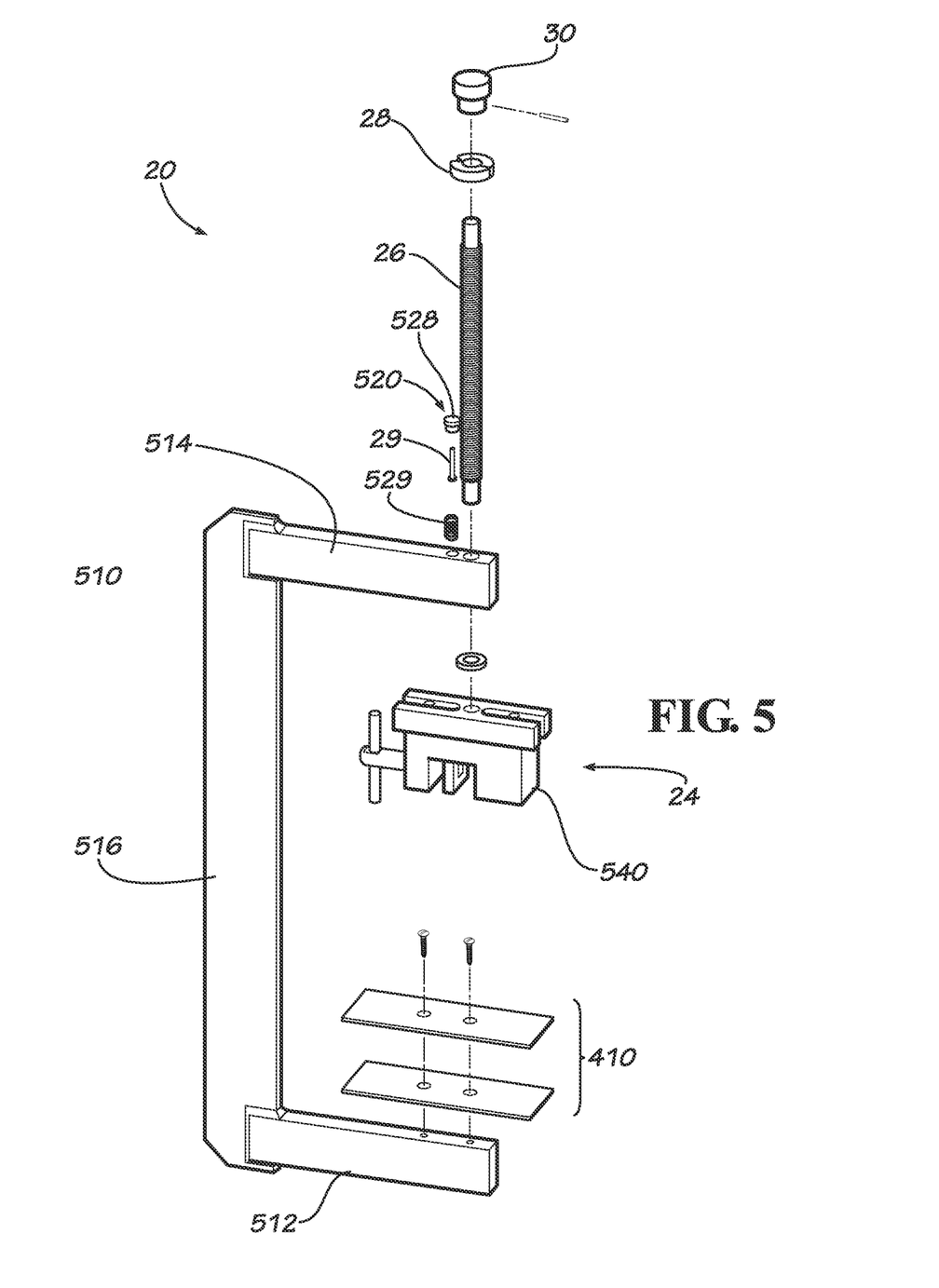
FIG. 5 is an exploded view of a clamp assembly of the NIMCO device of FIG. 1.

FIG. 5 illustrates the clamp assembly 20 in accordance with an embodiment of the present disclosure. As illustrated, the clamp assembly 20 includes a "C" shaped frame 510 with a first leg 512 configured to engage the bottom of the meter 2 and a second leg 514 configured to support a vice block assembly 24. Although a "C" shaped frame 510 is used in the current embodiment, any frame that performs a similar function may be used in various embodiments. The first leg 512 and second leg 514 are connected by a connector 516. The vice block assembly 24 is attached to the second leg 514 via a threaded shaft 26. The threaded shaft 26 may be rotated using knob 30 to adjust the linear distance between the vice block 24 and the first leg 512, although other linear distance adjusters may be used in various embodiments aside from the threaded shaft 26. The threaded shaft 26 may include a shaft collar 28 and linear travel gage 520. In the illustrated embodiment, the linear travel gage 520 is a pin 29, a spring 529, and a knob 528 secured to the top of the second leg 514 of the "C" shaped frame 510 and positioned to engage the shaft collar 28. The pin 29 may include a notch or other marking indicating a predetermined distance. As will be discussed in greater detail below, the shaft collar 28 may be adjusted to depress the pin 29 and abut the top of the second leg 514 of the clamp assembly 20. As the linear distance between the vice block 24 and the first leg 512 is increased, the shaft collar 28 will move away from the top of the second leg 514 and the markings on the pin 29 can be used to gauge the amount of linear travel of the shaft collar 28 (and as a result the change in linear distance between the vice block 24 and the first leg 512).

Figure 6:
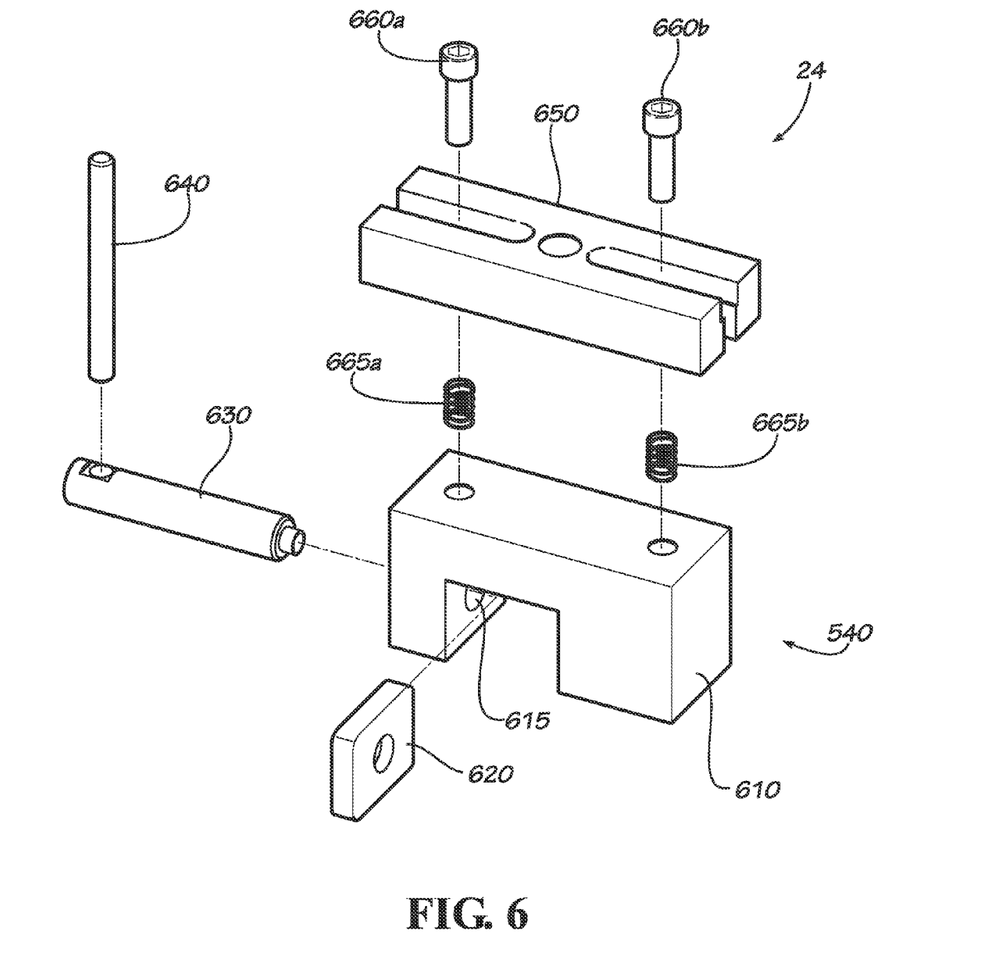
FIG. 6 is an exploded view of a vice block assembly of the NIMCO device of FIG. 1.

As illustrated in FIG. 5, the vice block 24 includes a clamping mechanism 540. This clamping mechanism 540 is configured to engage the meter bar 5. Other embodiments may not include the clamping mechanism 540 or may include another means of engaging the meter bar 5. FIG. 6 illustrates a vice block 24 in accordance with an embodiment of the present disclosure. A C-block 610 forms the clamping base. A clamp plate 620 is attached to a threaded clamp shaft 630 that provides linear travel along a threaded bore 615 in the clamp block 610. A handle 640 is attached to the clamp shaft 630. The vice block 24 also includes a bracket 650 that is secured to the C-block 610 by screws 660*a,b* that are screwed down through springs 665*a,b*. Springs 665*a,b* may be thread inserts in various embodiments or may be omitted.

Figure 7A:
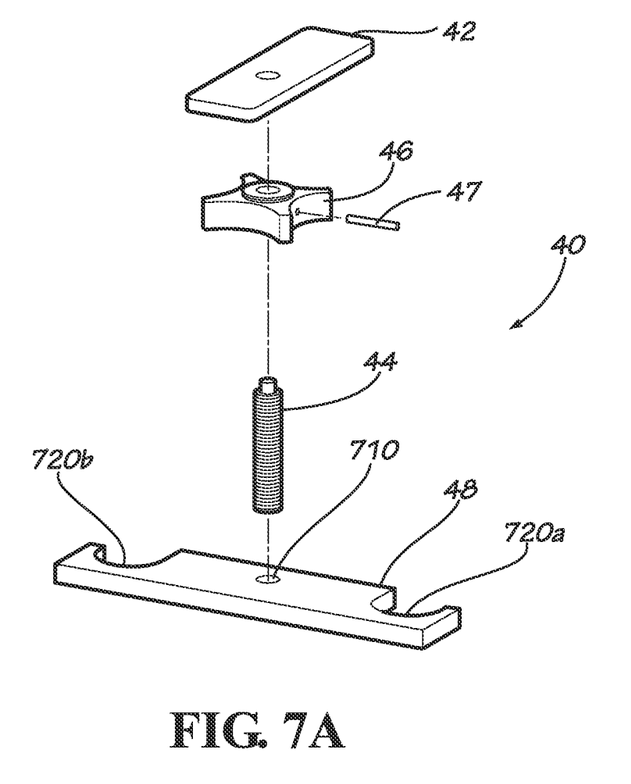
FIG. 7A is an exploded view of a hold down assembly of the NIMCO device of FIG. 1.
Figure 7B:
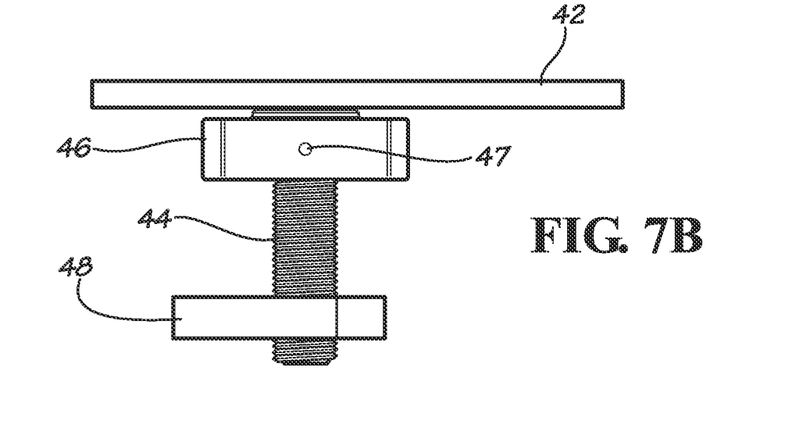
FIG. 7B is a side view of the hold down assembly of FIG. 7A.

Referring to FIGS. 4, 7A, and 7B, a hold down assembly 40 is secured to the vice block 24 opposite the threaded shaft 26. The hold down assembly 40 is configured to urge the inlet and outlet case assemblies 100, 200 into engagement with respective inlet and outlet swivel fittings 13,14 on the meter bar 5. The hold down assembly 40 includes a vice block mounting plate 42, a threaded rod 44, a knob 46, pin 47, and a hold down plate 48. The vice block mounting plate 42 is disposed adjacent the vice block 24 and facilitates attachment of the hold down assembly 40 to the vice block 24. One end of the threaded rod 44 is supported by the vice block mounting plate 42 and the opposite end engages a threaded hole 710 defined by the hold down plate 48. The knob 46 is disposed on the threaded rod 44 intermediate the vice block mounting plate 42 and the hold down plate 48 and is held in place by pin 47.

The hold down plate 48 includes notches 720*a,b* formed along one edge. The notches 720*a,b* are sized and spaced apart to provide clearance for the respective inlet and outlet swivel fittings 13,14 on the meter bar 5. In the illustrated embodiment, the notches 720*a,b* are semi-circular; however other embodiments may have different shaped notches 720*a, b*. In use, the knob 46 may be rotated to move the hold down plate 48 into engagement with the case assemblies 100,200 as illustrated in FIGS. 1-3. This engagement helps to secure the case assemblies 100,200 to the swivel fittings 13,14.

II. Inlet Case Assembly

Figure 8:
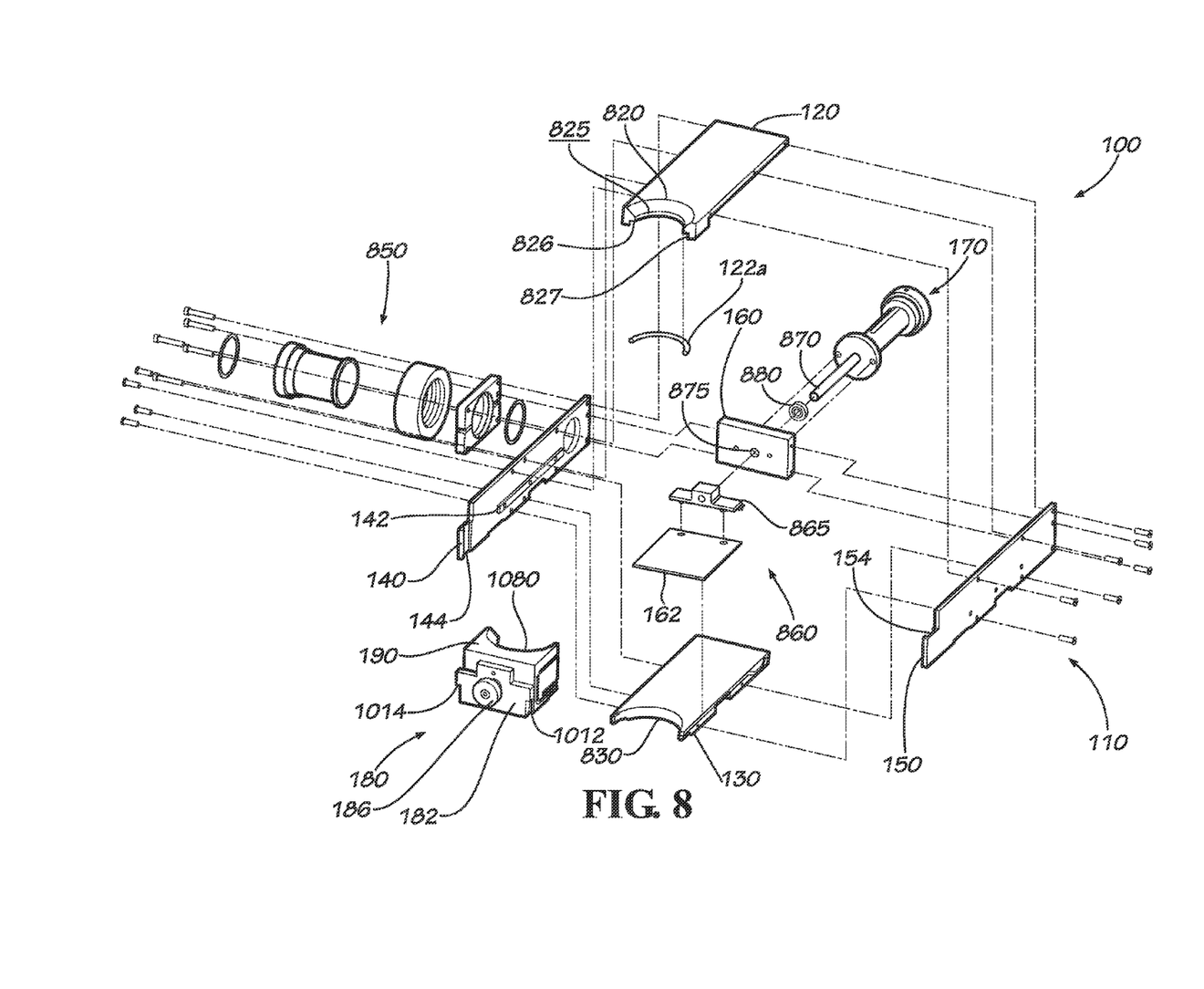
FIG. 8 is an exploded view of an inlet case assembly of the NIMCO device of FIG. 1.

As illustrated in FIGS. 1-4, the NIMCO device 10 includes an inlet case assembly 100 that is configured to enclose the joint between the inlet port 3 of the meter 2 and the inlet swivel fitting 13 of the meter bar 5. The inlet case assembly 100 seals against the inlet swivel fitting 13 and includes components which make up a slide valve that selectively directs fluid from the inlet swivel fitting 13 to an alternate bypass port made up of inlet port 1150 (shown in FIG. 11) and outlet port 850 (shown in FIG. 8). FIG. 8 provides an exploded view of an inlet case assembly 100 in accordance with an embodiment of the present disclosure. The inlet case assembly 100 includes a fixed half assembly 110 and a sliding half assembly 180. The fixed half assembly 110 includes a top plate 120, a bottom plate 130, a first side plate 140, a second side plate 150, and a back plate 160. The top and bottom plates 120,130 are substantially planar and rectangular with a semicircular notch 820,830 formed on one end of each plate 120, 130. On the top plate 120, the semicircular notch includes a first semicircular surface 825 and a second semicircular surface 827.

The two semicircular surfaces 825,827 have substantially the same center point with the radius of the first semicircular surface 825 being smaller than the radius of the second semicircular surface 827. A ledge 826 is formed at the transition between the two surfaces 825,827. This ledge 826 is sized to accept a semicircular seal 122*a* (e.g., half of an o-ring, resilient flat washer). In one embodiment, the seal 121 shown in FIG. 4 is cut in half, with one half being the semicircular seal 122*a* disposed against the ledge 826 in the top plate 120 and the other half being a semicircular seal 122*b* (shown in FIG. 10) disposed in a similar ledge 1026 (shown in FIG. 10) on the sliding half assembly 180. The notch 830 in the bottom plate 130 is also semicircular and has a radius larger than the two radiuses of the first and second semicircular surfaces 825,827 in the top plate 120. A complementary surface is formed on the sliding half assembly 180. The radius of the notch 830 of the bottom plate 130 is slightly larger than the diameter of the collars 310, 320 as is discussed in greater detail below.

The top and bottom plates 120, 130 are disposed in a space apart and parallel orientation with the lower surface of the top plate 120 facing the bottom plate 130 and the axes of the semicircular notches 820,830 in substantial alignment. The top and bottom plates 120, 130 are secured to the first and second side plates 140, 150 to form a rectangular tube. The back plate 160 is secured to the rectangular tube and closes the end of the rectangular tube opposite the semicircular notches 820,830.

Secured to the facing sides of the first and second side plates 140,150 are valve plate support blocks 142, 152 (152 not shown). The valve plate support blocks 142,152 guide a valve plate 162 as discussed in greater detail below.

The outlet port 850 is secured to the first side plate 140. The outlet port 850 is in fluid communication with the interior of the rectangular tube and is configured to engage the inlet port 1150 on the outlet case assembly 200 when the NIMCO device 10 is assembled.

The fixed half assembly 110 also includes a sliding plate valve 860 disposed within the rectangular tube. The sliding plate valve 860 includes a valve plate 162 that is disposed between the valve plate support blocks 142,152, attached to the first and second side plates 140,150, and the bottom plate 130. The valve plate 162 is connected to a bracket 865 which is then connected to a rod portion 870 of the handle assembly 170 which extends through an aperture 875 in the back plate 160. The rod portion 870 may be attached to the valve plate 162 via the bracket 865 or by another means. A seal 880 is provided between the rod portion 870 and the back plate 160 to minimize leakage of fluid from the rectangular tube.

Figure 9:
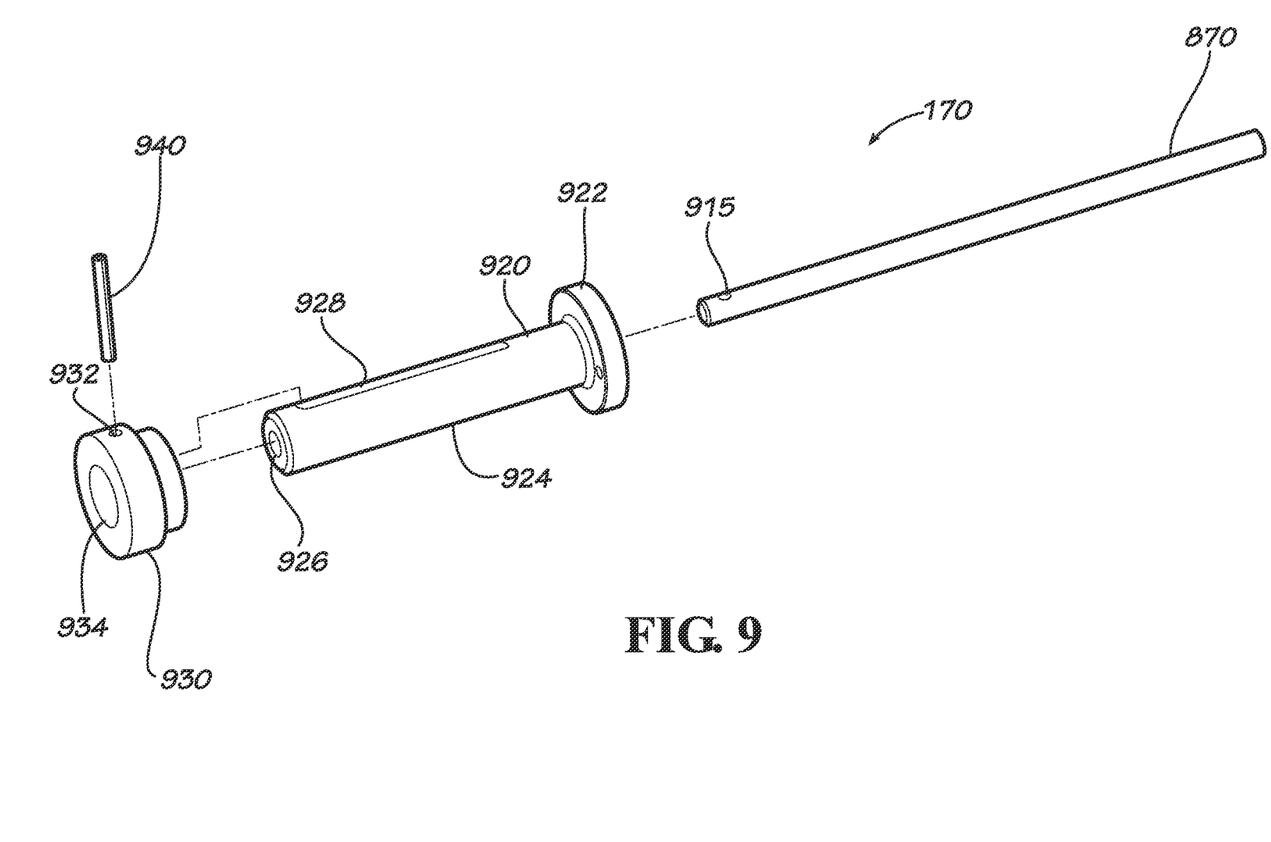
FIG. 9 is an exploded view of a handle assembly of the NIMCO device of FIG. 1.

FIG. 9 illustrates an exploded view of a handle assembly 170 in accordance with an embodiment of the present disclosure. The handle assembly 170 is configured to selectively move the valve plate 162 between an installation position proximate the back plate 160 and a bypass position where the valve plate 162 engages a semicircular notch 1080 (shown in FIG. 8) in the sliding half assembly 180. In the bypass position, the valve plate 162 extends across the semicircular notches 830, 1080 in the bottom plate 130 and the sliding half assembly 180, respectively. The handle assembly 170 includes the rod portion 870, which is its own separate piece in the current embodiment, although it may be a portion of another part in other embodiments. The rod portion 870 includes a bore 915 defined proximate one end. A collet 920 includes a flange 922 and a cylinder 924. A bore 926 is included in the center of the collet 920 and is sized larger than the rod portion 870. A slit 928 is defined in the wall of the cylinder 924 so that it extends longitudinally along the path of travel of the rod portion 870. A collar 930 is included and defines a bore 934 sized larger than the diameter of the cylinder 924. The collar 930 includes a pin bore 932 into which a lock pin 940 is pressed. The lock pin 940 is also pressed into the bore 915 so that the collar 930 and the rod portion 870 move together.

Returning to FIG. 8, the first and second side plates 140, 150 extend beyond the semicircular notches 820,830 of the top and bottom plates 120,130, respectively. Slide assembly mounting grooves 144,154 are formed on the extended portions of the side plates 140,150. The slide assembly mounting grooves 144,154 are configured to engage portions of the sliding half assembly 180.

Figure 10:
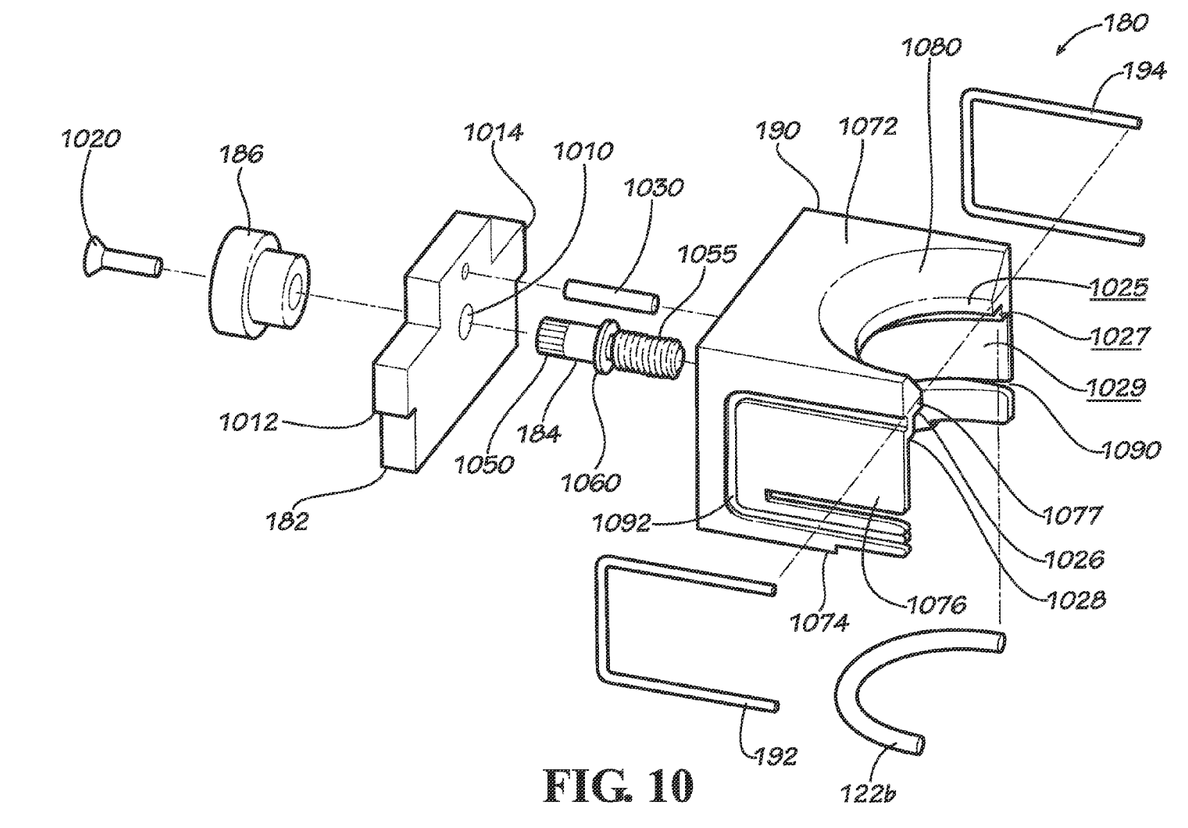
FIG. 10 is an exploded view of a sliding half assembly of the NIMCO device of FIG. 1.

FIG. 10 is an exploded view of the sliding half assembly 180 according to an embodiment of the present disclosure. The illustrated embodiment includes a plate bracket 182, a threaded stud 184, an associated knob 186, and a sliding block 190. The plate bracket 182 includes a pair of flanges 1012, 1014 sized and shaped to engage the mounting grooves 144, 154 in the side plates 140,150 in the fixed half assembly 110. The plate bracket 182 also defines an aperture 1010 sized to accept a portion of the threaded stud 184. A dowel pin 1030 is included to align the plate bracket 182 with the sliding block 190. A screw 1020 is included to hold the knob 186, plate bracket 182, and threaded stud 184 together.

The threaded stud 184 includes a knurled portion 1050 proximate one end and a threaded portion 1055 proximate the opposite end. An annular collar 1060 is disposed intermediate the knurled portion 1050 and the threaded portion 1055. The knurled portion 1050 is disposed through the aperture 1010 formed in the plate bracket 182 and the knob 186 is attached thereto. The threaded portion 1055 engages a complementary threaded hole (not shown) formed in the sliding block 190.

The sliding block 190 generally includes a top side 1072, a bottom side 1074, a right side 1076, a left side 1078 (not shown), a front side 1077, and a back side 1079 (not shown). The threaded hole (not shown) is formed on the back side 1079 of the sliding block 190. A semicircular notch 1080 is formed on the front side 1077 of the sliding block 190 with an axis oriented top to bottom. The semicircular notch 1080 includes three semicircular surfaces 1025,1027,1029. The three semicircular surfaces 1025,1027,1029 have substantially the same center point with the radius of the top semicircular surface 1025 being smaller than the middle semicircular surface 1027. A ledge 1026 is formed at the transition between the top semicircular surface 1025 and the middle semicircular surface 1027. This ledge 1026 is sized to accept a semicircular seal 122*b*. This ledge 1026 is complementary to the ledge 826 formed on the top plate 120, and the seal 122*b* is the other half of the o-ring composed with seal 122*a*. The radius of the middle semicircular surface 1027 is smaller than the radius of the bottom semicircular surface 1029. A ledge 1028 is formed at the transition between the middle semicircular surface 1027 and the bottom semicircular surface 1029. The radius of the bottom semicircular surface 1029 is substantially the same as the radius of the semicircular notch 830 in the bottom plate 130.

A planar groove 1090 is formed proximate the bottom side 1074 of the slide block 190 and extends from the front side 1077 towards the back side 1079 of the slide block 190. This planar groove 1090 is configured to receive a portion of the valve plate 162 when in the bypass position. The depth of the planar groove 1090 is approximately the same as the semicircular notch 1080 or deeper.

The right and left sides 1076,1078 of the sliding block 190 each include a channel 1092,1094 (1094 not shown) following a "U" shaped path that is sized to accept a U-shaped seal 192,194, respectively. When the inlet case assembly 100 is assembled, each U-shaped seal 192,194 engages the side plates 150,140, respectively, of the fixed half assembly 110.

Returning to FIG. 8, the sliding block assembly 180 is disposed with the flanges 1012,1014 of the plate bracket 182 engaging respective grooves 154,144 in the side plates 150, 140 and the semicircular notch 1080 of the sliding block 190 and facing the semicircular notches 820,830 of the fixed half assembly 110. The knob 186 on the sliding block assembly 180 may then be turned (or simply pushed in various embodiments) to move the sliding block 190 towards the fixed half assembly 110. In various embodiments, the sliding block 190 is moved until it abuts a portion of the fixed half assembly 110 and the axes of the semicircular notches 820,830 in the fixed half assembly 110 are substantially aligned with the semicircular notch 1080 in the sliding half assembly 180.

III. Outlet Case Assembly

Figure 11:
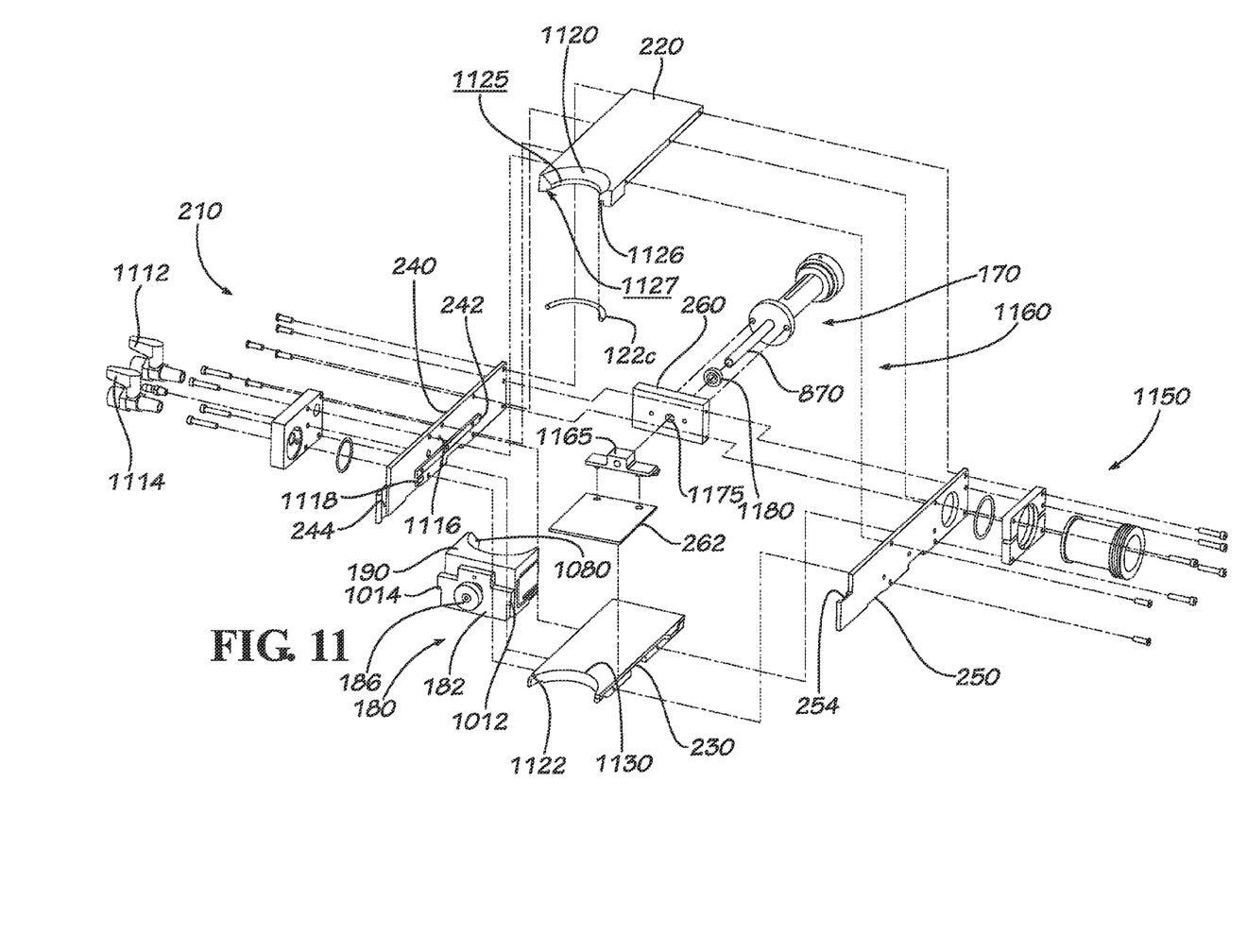
FIG. 11 is an exploded view of an outlet case assembly of the NIMCO device of FIG. 1.
Figure 12A:
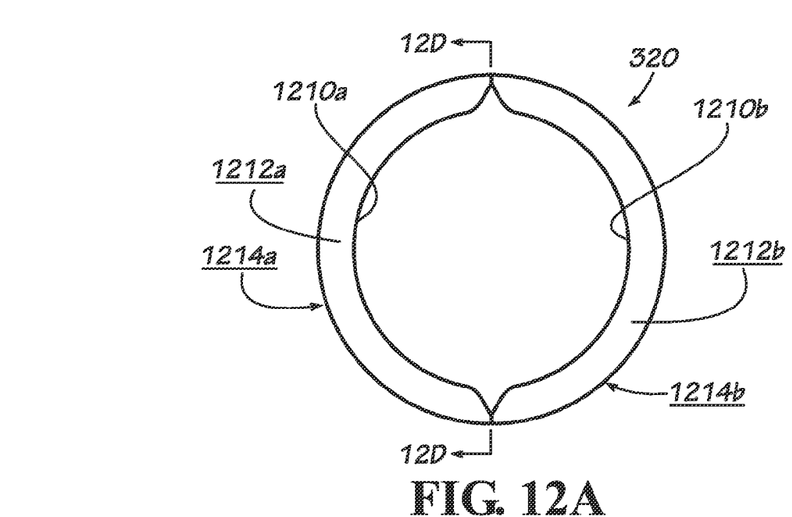
FIG. 12A is a top view of a gasket removal collar of the NIMCO device of FIG. 1.
Figure 12B:
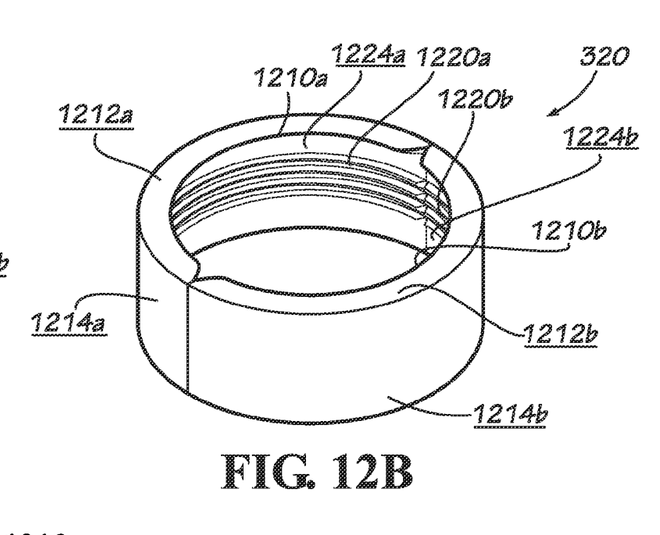
FIG. 12B is a perspective view of the gasket removal collar of FIG. 12A.
Figure 12C:
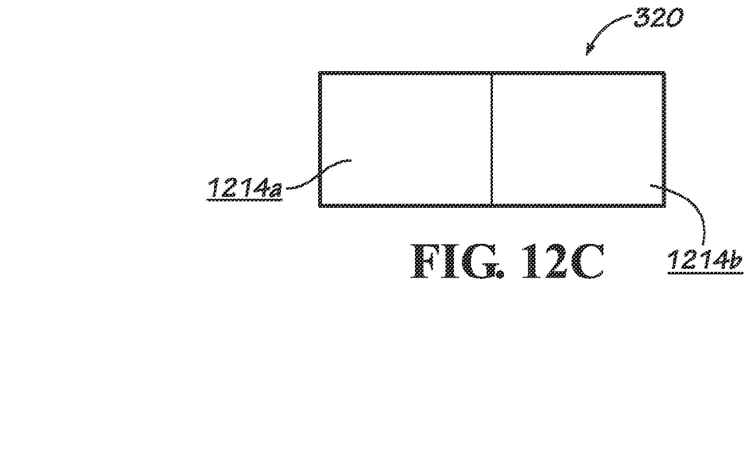
FIG. 12C is a side view of the gasket removal collar of FIG. 12A.
Figure 12D:
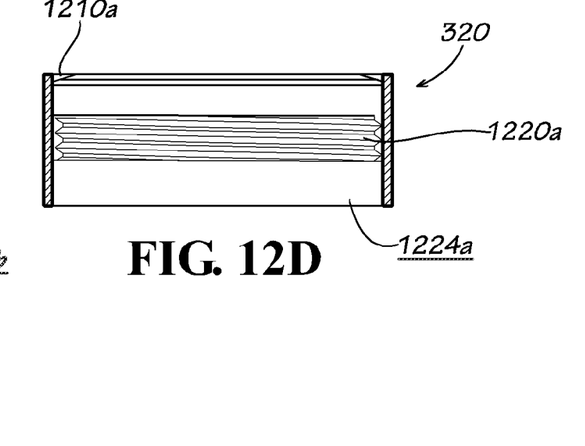
FIG. 12D is a cutaway view of the gasket removal collar of FIG. 12A taken along the plane indicated by line 12D in FIG. 12A.
Figures 13A, 13B, 13C, 13D, 13E:
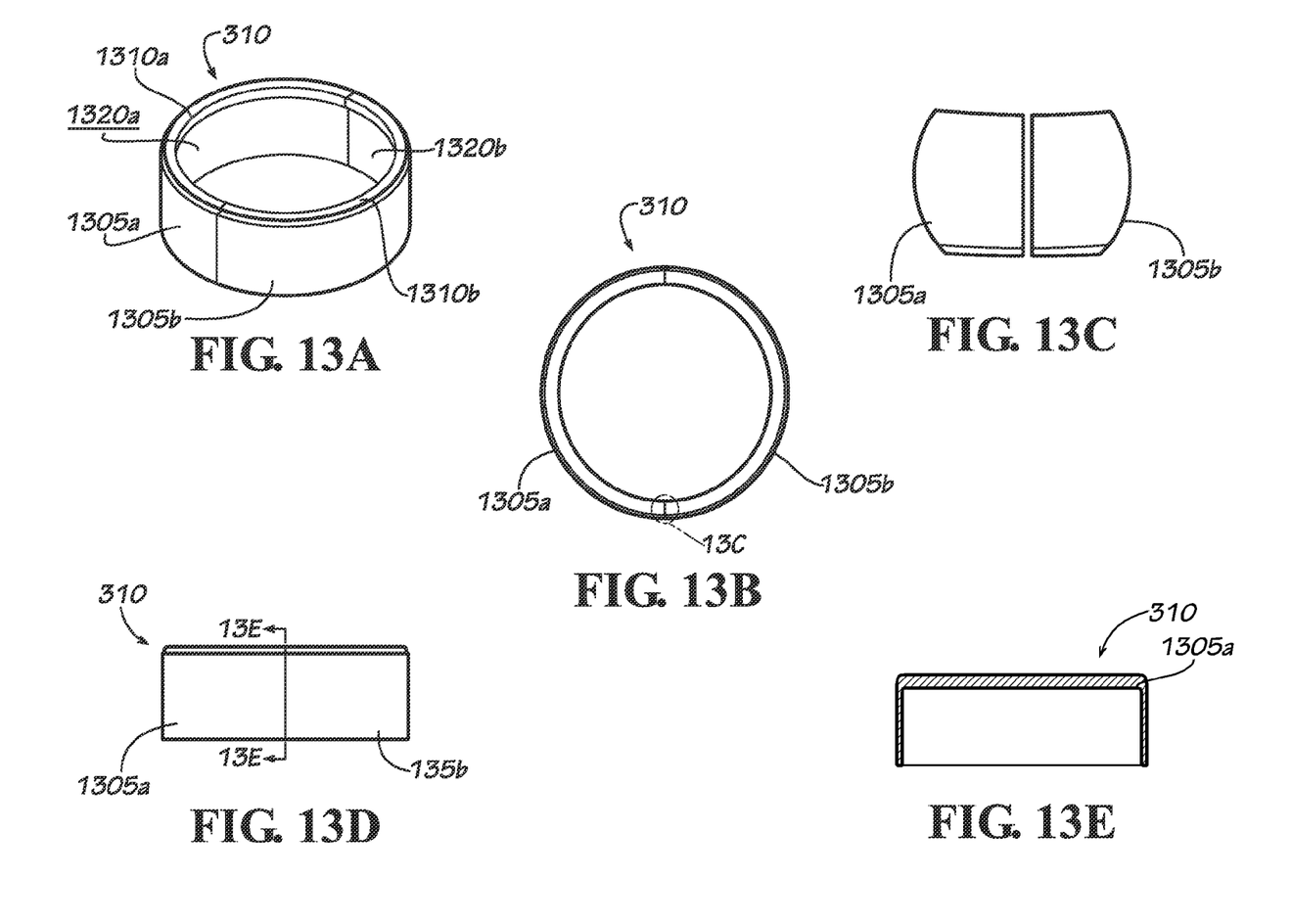
FIG. 13A is a perspective view of a gasket installation collar of the NIMCO device of FIG. 1.
FIG. 13B is a top view of the gasket installation collar of FIG. 13A.
FIG. 13C is a detail view of the gasket installation collar of FIG. 13A as indicated by detail 13C in FIG. 13B.
FIG. 13D is a side view of the gasket installation collar of FIG. 13A.
FIG. 13E is a cutaway view of the gasket installation collar of FIG. 13A taken along the plane indicated by line 13E in FIG. 13D.

The outlet case assembly 200 is similar to the inlet case assembly 100. FIG. 11 provides an exploded view of an outlet case assembly 200 in accordance with an embodiment of the present disclosure. As illustrated in FIGS. 1-4, the NIMCO device 10 includes an outlet case assembly 200 that is configured to enclose the joint between the outlet port 4 of the meter 2 and the outlet swivel fitting 14 of the meter bar 5. The outlet case assembly 200 seals against the outlet swivel fitting 14 and includes the slide valve that selectively directs fluid from the inlet port 1150 to the outlet swivel fitting 14, thereby completing the bypass of the meter 2.

FIG. 11 provides an exploded view of the outlet case assembly 200 in accordance with an embodiment of the present disclosure. The outlet case assembly 200 includes a fixed half assembly 210 and a sliding half assembly 180. The fixed half assembly 210 includes a top plate 220, a bottom plate 230, a first side plate 240, a second side plate 250, and a back plate 260. The top and bottom plates 220,230 are substantially planar and rectangular with a semicircular notch 1120,1130 formed on one end, respectively. The semicircular notch 1120 in the top plate 220 includes two semicircular surfaces 1125,1127. The two semicircular surfaces 1125,1127 have substantially the same center point with the radius of the top semicircular surface 1125 being smaller than the radius of the bottom semicircular surface 1127. A ledge 1126 is formed at the transition between the two surfaces 1125,1127. This ledge 1126 is sized to accept a semicircular seal 122c (e.g., half of an o-ring, resilient flat washer). In one embodiment, the seal 121 shown in FIG. 4 is cut in half, with one half being the semicircular seal 122c disposed against the ledge 1126 in the top plate 220 and the other half being a semicircular seal 122d (not shown) disposed in a similar ledge 1026 (not shown) on the sliding half assembly 180.

The notch 1130 in the bottom plate 230 is also semicircular and has a radius larger than the two radiuses of the semicircular surfaces 1125,1127 in the top plate 220. A complementary surface is formed on the sliding half assembly 180. The radius of the bottom plate notch 1130 is slightly larger than the diameter of the gasket installation collars 310a,b and the gasket removal collars 320a,b.

The top and bottom plates 220, 230 are disposed in a spaced apart parallel orientation with the lower surface of the top plate 220 facing the bottom plate 230 and the axes of the semicircular notches 1120,1130 in substantial alignment. The top and bottom plates 220, 230 are secured to the first and second side plates 240, 250 to form a rectangular tube. The back plate 260 is secured to the rectangular tube and closes the end of the rectangular tube opposite the semicircular notches 1120,1130.

The first side plate 240 includes two purge valves 1112, 1114 attached that may be selectively opened to purge air from the NIMCO device 10 and/or the new meter. Air that is not purged from the system may cause pilot light burnout during meter change out. Each purge valve 1112,1114 is in fluid communication with the interior of the rectangular tube formed by the top, bottom and side plates 220,230,240,250. One purge valve 1112 is ported to allow purging of the cavities within the case assemblies 100,200. This purge valve 1112 is in fluid communication with a pin hole 1116 proximate the center of the first side plate 240 that is in communication with the interior of the rectangular tube.

The second purge valve 1114 is ported to purge the meter 2 during installation. This second purge valve 1114 is in fluid communication with an oval slot 1118 disposed between a bottom edge of the first side plate 240 and a valve plate support block 242 (a valve plate support block 252 is not shown but is included on the second side plate 250). In the assembly, the oval slot 1118 is aligned with a cutout portion 1122 on a top surface of the bottom plate 230 proximate the semicircular notch 1130.

The inlet port 1150 is secured to the second side plate 250. This inlet port 1150 is in fluid communication with the interior of the rectangular tube and is configured to engage an outlet port 850 (shown in FIG. 8) on the inlet case assembly 100 when the NIMCO device 10 is assembled. Secured to the facing sides of the first and second side plates 240,250 are valve plate support blocks 242, 252 (252 not shown). The valve plate support blocks 242,252 guide a valve plate 262 as discussed in greater detail below.

The fixed half assembly 210 also includes a sliding plate valve 1160 disposed within the rectangular tube. The sliding plate valve 1160 includes the valve plate 262 that is disposed between the valve plate support blocks 242,252, attached to the first and second side plates 240,250, and the bottom plate 260. The valve plate 262 is connected to the rod portion 870 of the handle assembly 170 which extends through an aperture 1175 in the back plate 260. The rod portion 870 may be attached to the valve plate 262 via a bracket 1165 or by another means. A seal 1180 is provided between the rod portion 870 and the back plate 260 to minimize leakage of fluid from the rectangular tube. FIG. 9 illustrates an exploded view of a handle assembly 170 in accordance with an embodiment of the present disclosure as discussed previously.

Similar to the inlet case assembly 100, the handle assembly 170 is configured to selectively move the valve plate 262 between an installation position proximate back plate 260 and a bypass position where the valve plate 262 engages a planar groove 1090 in the sliding half assembly 180. In the bypass position, the valve plate 262 extends across the semicircular notches 1130,1080 in the bottom plate 230 and the sliding half assembly 180, respectively.

With reference to FIG. 11, the first and second side plates 240,250 extend beyond the semicircular notches 1120,1130 of the top and bottom plates 220,230. Slide assembly mounting grooves 244,254 are formed on the extended portions of these side plates. The slide assembly mounting grooves 244, 254 are configured to engage portions of the sliding half assembly 180 as described previously with reference to the inlet case assembly 100. The outlet case assembly 200 uses the same sliding half assembly 180 as disclosed above with reference to the inlet case assembly 100.

The sliding half assembly 180 is disposed with the flanges 1014,1012 of the plate bracket 182 engaging respective grooves 244,254 in the side plates 240, 250 and the semicircular notch 1080 of the sliding block 190 and facing the semicircular notches 1120,1130 of the fixed half assembly 210. The knob 186 on the sliding block assembly 180 may then be turned (or simply pushed in various embodiments) to move the sliding block 190 towards the fixed half assembly 210. In various embodiments, the sliding block 190 is moved until it abuts a portion of the fixed half assembly 210 and the axes of the semicircular notch 1080 in the sliding half assembly 180 is substantially aligned with the notches 1120,1130 of the fixed half assembly 210.

IV. Gasket Removal Collar

FIGS. 12A, 12B, 12C, and 12D illustrate a gasket removal collar 320 in accordance with an embodiment of the present disclosure. The gasket removal collar 320 is a two piece annular ring having an outer radius slightly smaller than the radius of the semicircular notch 830,1130 in the bottom plate 130,230 and the bottom semicircular surface 1029 in the sliding half assembly 180. In some embodiments, the difference between the two radiuses is approximately 0.010 inches.

An inwardly directed lip 1210a,b is formed on one end. In various embodiments, the lip 1210a,b may have a right-triangular cross section with a top surface 1212a,b being substantially perpendicular to an outer surface 1214a,b of the gasket removal collar 320. Threads 1220a,b are formed on at least a portion of an inner surface 1224a,b of the gasket removal collar 320. These threads 1220a,b are sized and shaped to engage threads on the meter 2. In use, the two pieces are disposed on the meter inlet 3 and outlet 4 with the threads on the gasket removal collar 320 engaging threads on the meter 2 and the inwardly directed lip 1210a,b disposed intermediate the gasket (not shown) and a flange of the swivel fitting 13,14. In various embodiments, the triangular shape of the inwardly directed lip 1210a,b may aid with insertion of the inwardly directed lip 1210a,b between the gasket (not shown) and the swivel fitting 13,14. As will be discussed in greater detail below, the engagement of the gasket removal collar 320 with the threads on the meter 2 and the gasket (not shown) encourages the gasket (not shown) to remain with the meter 2 when the meter 2 is removed from the swivel fittings 13,14.

V. Gasket Installation Collar

With reference to FIGS. 13A, 13B, 13C, 13D, and 13E, the gasket installation collar 310 is also a two-piece annular ring having substantially the same outer radius as the gasket removal collar 320. An inwardly directed lip 1310a,b is formed on one end. In contrast to the gasket removal collar 320, an inner surface 1320a,b of the gasket installation collar 310 does not include threads formed thereon. In use, two halves 1305a,b of the gasket installation collar 310 are engaged around threads and the gasket (not shown) of the meter 2 disposed proximate the meter inlet 3 or outlet 4. As will be discussed in greater detail below, the engagement of the gasket installation collar 310 with the meter 2 and the gasket (not shown) aids in positioning the gasket (not shown) during installation of the meter 2.

VI. Method of Use

In accordance with various embodiments of the present disclosure, the NIMCO device 10 may be used to facilitate change out of the meter 2 or another meter in communication with a pipeline without interrupting the flow of fluid within the pipeline. The change out process begins by installing the clamp assembly 20 to the meter 2 and meter bar 5. This may include disposing the vice block 24 of the NIMCO device 10 against the meter bar 5 and tightening it against the meter bar 5. Next, a bottom portion 410 of the clamp assembly 20 is raised until it abuts a bottom of the meter 2 by turning the knob 30. Then, the shaft collar 28 is rotated about the threaded rod 26 until it depresses the spring loaded pin and contacts the top of the "C" shaped frame 510.

After the clamp assembly 20 is disposed on the meter 2 and meter bar 5, the swivel fittings 13,14 may be loosened by loosening nuts. These nuts may then be slid upward along each swivel fitting 13,14 and held in place with tape, wire, or another mechanism (see FIGS. 1-3). At this point, a flange of the swivel fitting 13,14 and the threads of the meter 2 may be cleaned using a wire brush to remove rust, loose paint or other debris. Because the meter 2 is held in place by the clamp assembly 20, the nuts are not required to ensure a seal with the fluid in the pipeline.

Once the nuts are displaced and the area cleaned, the gasket removal collar 320 may be installed on each of the inlet 3 and outlet 4 of the meter 2. In various embodiments this process may include disposing a knife edge intermediate the gasket (not shown) and the flange of the swivel fitting 13,14 to allow separation of the gasket (not shown) from the swivel fitting 13,14 on both the inlet 3 and outlet 4 joints prior to installation of the gasket removal collars 320. In some cases, this may involve minor cutting of the gasket (not shown). In various embodiments, grease is then applied to the swivel fitting 13,14, gasket (not shown), and meter threads. "Grease" used in this disclosure may be any sealant sufficient to provide a substantially leak-resistant seal, including petrolatum jelly, RTV, oil, plastic and rubber coatings, and sealing tapes such as Teflon tape, among others. The grease can help seal the gasket removal collars 320 when installed. Next, each gasket removal collar 320 is separated into two halves and the lips 1210a,b of the gasket removal collar 320 are urged between the flange of the swivel fitting 13,14 and gasket (not shown) on the respective joints. The gasket removal collar 320 halves are mated around the joint such that they form a cylinder and may be rotated back and forth about the centerline to facilitate engagement between the threads on the meter 2 and the threads formed on the inner surface of each gasket removal collar 320. Grease may be applied to the exterior of each gasket removal collar 320 to facilitate sealing between the gasket removal collar 320 and the inlet/outlet case assemblies 100,200.

The next step in the process involves installing the inlet and outlet case assemblies 100,200. Starting with the inlet case assembly 100, the valve plate 162 is adjusted into the installation position. Next, the fixed half assembly 110 is disposed with the semicircular notches 820,830 facing the meter 2/gasket(not shown)/swivel fitting 13,14 joint with the seal 122a on the top plate 120 abutting the top surface of the flange of the swivel fitting 13,14.

The sliding half assembly 180 is then disposed with the semicircular notch 1080 facing the meter 2/gasket(not shown)/swivel fitting 13,14 joint and the plate bracket flanges 1014,1012 engaging the grooves 144,154 formed in the side plates 140,150 of the fixed half assembly 110. The knob 186 on the sliding half assembly 180 may then be turned causing the sliding block 190 to move towards the meter 2/gasket(not shown)/swivel fitting 13,14 joint. The knob 186 may be turned until the sliding block 190 abuts the fixed half assembly 110 and/or the axes of the semicircular notches 1080,820, 830 are substantially aligned.

Installation of the outlet case assembly 200 follows substantially the same procedure. The fixed half assembly 210 is disposed with the semicircular notches 1120,1130 facing the meter 2/gasket(not shown)/swivel fitting 13,14 joint with the seal 122c abutting the top surface of the flange of the swivel fitting 13,14. The sliding half assembly 180 is then disposed with the semicircular notch 1080 facing the meter 2/gasket (not shown)/swivel fitting 13,14 joint and the plate bracket flanges 1014,1012 engaging the grooves 244,254 formed in the side plates 240,250 of the fixed half assembly 110. The knob 186 of the sliding half assembly 180 may then be turned causing the sliding block 190 to move towards the meter 2/gasket(not shown)/swivel fitting 13,14 joint. The knob 186 may be turned until sliding block 190 abuts the fixed half assembly 210 and/or the axes of the semicircular notches 1080,1120,1130 are substantially aligned.

Following installation of the inlet and outlet case assemblies 100,200 to the meter 2/gasket(not shown)/swivel fitting 13,14 joint, the inlet and outlet case assembly ports 850,1150 may be joined. As this point, the inlet and outlet case assemblies 100,200 are in fluid communication. The knob 46 of the hold down assembly 40 may now be turned such that the hold down plate 48 engages the top of the inlet and outlet case assemblies 100,200.

The next step in the process is to purge the inlet and outlet case assemblies 100,200. This may be performed by opening the purge valve 1112 (as previously described) and then unscrewing the knob 30 of the clamp assembly 20 to lower the meter 2. The movement of the meter 2 may be monitored based on markings on the linear travel gauge 520, also called a spring loaded pin 29. For example, the meter 2 may be lowered until the marking on the pin 29 is lined up with the top surface of the "C" shaped frame 510. In various embodiments, this predetermined distance displaces the gasket (not shown) away from the swivel fitting 13,14 thereby allowing fluid to flow into the inlet case assembly 100. However, a portion of the meter ports 3,4, the gaskets (not shown), and the gasket removal collars 320 remain in the inlet case assembly 100. The portion of the gasket removal collars 320 still within the inlet case assembly 100 provides a seal with the semicircular surfaces 1027, 827 of the sliding block assembly 180 and the bottom plate 230 of the case assembly 110, respectively. This seal discourages escape of fluid from the inlet case assembly 100 in this area.

In various embodiments, the purge valve 1112 remains open for a predetermined amount to time to purge the inlet and outlet case assemblies 100,200. In some embodiments, this time period is approximately 20 seconds. At that point, the purge valve 1112 may be closed. Next, the valve plates 162,262 in the inlet and outlet case assemblies 100,200 are moved to the bypass position by pushing both handle assemblies 170 to the most forward position. In this position, each valve plate 162,262 seals over the void defined by the interaction of the notches 830,1080 and 1130,1080 proximate each bottom plate 130,230 and the bottom of each slide block 190. As a result, fluid is allowed to flow only from the swivel inlet fitting 13 through the inlet case assembly 100 to the outlet case assembly 200 and to the swivel outlet fitting 14.

The meter 2 can now be removed by loosening the clamp assembly 20. The gasket removal collars 320 may be removed at this point. The first step in installing a new meter 2' (not shown) is to secure new gaskets (not shown) to inlet and outlet ports 3',4' (not shown) of the new meter 2'. This process involves applying grease to the new gasket (not shown) and threads of the new meter 2'. Next, the new gaskets (not shown) are disposed on the ports 3',4'. The gasket installation collars 310 are then split into halves and installed with the lips 1310a,b of the gasket installation collars 310 around the new gasket (not shown) and on top of the meter ports 3',4' to retain the new gaskets (not shown) In the illustrated embodiment, grease is then applied to an outer surface of the collars.

The meter 2' may then be placed on the bottom portion 410 of the clamp assembly 20. The clamp assembly 20 may then be adjusted to draw the meter ports 3',4' into the inlet and outlet case assemblies 100,200. In various embodiments, the meter 2' is drawn up into the case assemblies 100,200 until the mark on the pin 29 is aligned with the upper surface of the "C" shaped frame 510. In various embodiments, this distance corresponds with the meter 2' being positioned such that a portion of the gasket installation collars 310 are disposed within the case assemblies 100,200, but not at a depth that blocks the oval slot 1118 in the outlet case assembly 2000 that is in communication with the purge valve 1114.

In some embodiments, partial blocking of the oval slot 1114 may be allowable. Next, the valve plate 162 on the inlet case assembly 100 is moved to the installation position with the handle assembly 170 pulled backward. The meter 2' may then be purged by opening purge valve 1114 associated with the meter 2' on the outlet case assembly 200. Once the meter 2' is purged of air and filled with fluid, the purge valve 1114 may be closed. In various embodiments, the purge process is allowed to proceed for a predetermined period of time, which may depend on the physical size of the meter 2'.

Next, the valve plate 262 on the outlet case assembly 200 is moved to the installation position by pulling the handle assembly 170 away from the outlet case assembly 200. The meter 2' and new gaskets (not shown) are then raised into contact with the swivel fittings 13,14 using the claim assembly 20. In various embodiments, the meter 2' is at the proper position when the shaft collar 28 contacts the upper surface of the clamp assembly 20. The inlet and outlet case assemblies 100,200 may then be removed and nuts of the swivel fittings 13,14 tightened onto the meter 2'.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the disclosures herein are not to be limited to the specific embodiments disclosed and that modifications and other embodiments are intended to be included within the scope of the various embodiments. Although specific terms are employed herein, they are used in a generic and descriptive sense only and not for purposes of limitation.

The invention claimed is:

1. A method of replacing a preexisting meter that is in fluid communication with a pipeline having swivel fittings with a replacement meter, the method comprising the steps of:
  affixing a clamp assembly to the pipeline;
  drawing the clamp assembly to secure the preexisting meter to the pipeline;
  inserting a gasket removal collar between at least one gasket and at least one swivel fitting;
  connecting at least one case assembly to at least one of the preexisting meter and at least one swivel fitting;
  partially removing the preexisting meter from at least one swivel fitting and from the clamp assembly;
  activating a fluid bypass;
  fully removing the preexisting meter;
  inserting a gasket installation collar on at least one gasket of the replacement meter;
  placing the replacement meter in the clamp assembly;
  adjusting the replacement meter to fluid communication with at least one case assembly;
  deactivating the fluid bypass;
  adjusting the replacement meter to fluid communication with at least one swivel fitting;
  removing at least one case assembly;
  securing the replacement meter to the pipeline; and,
  removing the clamp assembly from the pipeline.

2. The method of claim 1, further comprising:
  measuring the vertical position of the preexisting meter; and
  adjusting the new meter to the measured vertical position.

3. The method of claim 1, further comprising purging the at least one case assembly of oxygen.

4. The method of claim 1, further comprising purging the replacement meter of oxygen.

5. The method of claim 1, wherein
  the step of activating the fluid bypass includes moving at least one valve plate to a bypass position; and
  the step of deactivating the fluid bypass includes moving the at least one valve plate to a meter flow position.

* * * * *